United States Patent
Rodriguez

(10) Patent No.: US 6,669,084 B1
(45) Date of Patent: Dec. 30, 2003

(54) OPTICAL TRANSACTION CARD

(75) Inventor: Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,912

(22) Filed: Dec. 17, 1998

(51) Int. Cl.⁷ .............................................. G06F 17/00
(52) U.S. Cl. ........................ 235/375; 235/487; 235/494
(58) Field of Search ............................ 705/41; 235/375, 235/494, 487

(56) References Cited

U.S. PATENT DOCUMENTS

| | | | | |
|---|---|---|---|---|
| 5,280,468 A | * | 1/1994 | Nakajima et al. | 369/275 |
| 5,410,142 A | * | 4/1995 | Tsuboi et al. | 235/488 |
| 5,461,239 A | * | 10/1995 | Atherton | 250/566 |
| 5,497,367 A | * | 3/1996 | Yamagami et al. | 369/275.2 |
| 5,875,170 A | * | 2/1999 | Tompkin et al. | 369/275.1 |
| 5,982,736 A | * | 11/1999 | Pierson | 369/273 |
| 6,016,955 A | * | 1/2000 | De Rooij et al. | 235/379 |
| 6,122,355 A | * | 9/2000 | Strohl | 379/144 |
| 6,134,309 A | * | 10/2000 | Carson | 379/144 |
| 6,386,446 B1 | * | 5/2002 | Himmel et al. | 235/380 |

OTHER PUBLICATIONS

Anonymous, Payphones: Smartcards for smarter payphones, Sep. 1993, Communications International p44–48.*

* cited by examiner

Primary Examiner—Thien M. Le
Assistant Examiner—Daniel A. Hess
(74) Attorney, Agent, or Firm—Jeffrey S. LaBaw; Anne V. Dougherty

(57) ABSTRACT

A transaction card comprises an optical card created using CD-ROM technology which can be read and erased but not reprogrammed. The optical transaction card is programmed (i.e., written to) at bit increments representing, in total, the stated value of the card; and, is then decremented by erasing the incremental bits during use. Once bits have been erased, they cannot be reprogrammed.

10 Claims, 4 Drawing Sheets

OPTICAL TRANSACTION CARD

FIELD OF THE INVENTION

This invention relates to the field of electronic transactions, and more particularly relates to optical transaction cards which use CD-ROM technology to represent cash or other value for use in computer-aided value transactions.

BACKGROUND OF THE INVENTION

Transaction cards have become a preferred media for monetary, or other value, transactions due to ease of use, portability, and self-contained loss limits in the case of theft or accidental misplacement of one's card. Assigning the card a fixed "face value," which is decremented with use, not only limits the amount sacrificed due to loss or theft, but also allows users to maintain budgets, particularly when used by children. Transaction cards have gained widespread acceptance for telephone usage, wherein the "currency" of the face value is minutes of long distance calling; for toll payment, such as the "E-Z Pass" program on New York State toll roads; for gas purchases, generally from a fixed group of merchants (e.g., Mobil gas stations), etc.

The types of transaction cards which are presently available include the category of magnetic cards (as shown at 10 in front-view FIG. 1A and back-view FIG. 1B with magnetic stripe 12 disposed on the back of the card), which have encoded information provided in a magnetic stripe, and so-called "smart cards" (20 of front-view FIG. 2A and inside-view FIG. 2B) which have on-board processors, 22, memory locations, 23, and interface logic, 24, to ensure integrity and reliability. While the magnetic versions are generally much less expensive to produce, their drawbacks include the fact that, in most instances, the magnetic medium can be reprogrammed to illegally add value to a "spent" card. In addition, the magnetic media suffers from vulnerability to accidental erasure through incidental exposure to electrical or magnetic fields. Magnetic card programming equipment and readers represent other sources of error in the use of magnetic cards since their reliability is not optimal.

Disadvantages of the smart card implementation include the expense of the memory, logic, and processor components, and the attendant processing needed for creating each card. Smart cards have been developed with security measures to minimize the risk of counterfeiting cards or altering the programming thereof. Those security measures are, however, limited to the security algorithms which are built into the card and to the security measures which are part of the host card-programming application, and which also add further expense to the production and maintenance of smart cards.

At present, cash cards and smart cards have been limited in their usage to dedicated transactions. For example, a telephone calling card cannot be used to ride a subway, and vice versa. Each merchant or group of closely-related merchants requires the use of a specific card which is monitored (i.e., decremented) by a proprietary system. Therefore, while a user may find transaction cards to be conveniently portable, carrying a dozen such cards can become more burdensome (though still less risky) than carrying cash or a credit card.

What is a desirable objective, therefore, is to provide a transaction card in a medium which would be both cost effective and secure.

Another objective is to provide a transaction card which could be used for a variety of non-related transactions.

Yet another objective of the invention is to provide a transaction card which is not prone to accidental erasure.

Still another objective of the invention is to provide a transaction card which can be programmed and read with reliable and inexpensive equipment.

SUMMARY OF THE INVENTION

These and other objectives are realized by the present invention wherein the transaction card comprises an optical card created using CD-ROM technology which can be read and erased but not reprogrammed. The optical transaction card is programmed (i.e., written to) at bit increments representing, in total, the stated value of the card; and, is then decremented by erasing the incremental bits during use. Once bits have been erased (or otherwise marked as "used"), they cannot be reprogrammed.

BRIEF DESCRIPTION OF THE DRAWINGS

The invention will now be described in greater detail with specific reference to the appended drawings wherein.

DESCRIPTION OF THE PREFERRED EMBODIMENT

Optical Transaction Cards

Figure 1A:
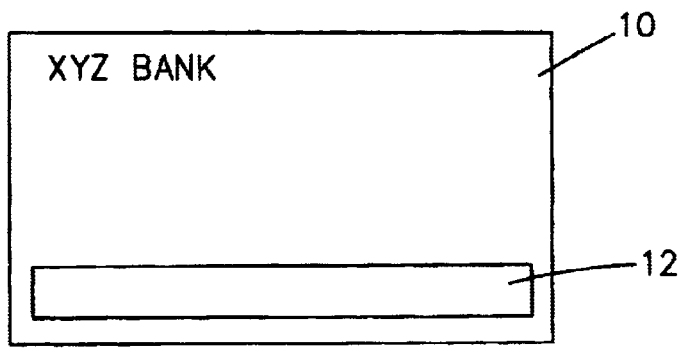
FIGS. 1A and 1B provide illustrations of the front and back views, respectively, of a prior art magnetic cash card.
Figure 1B:
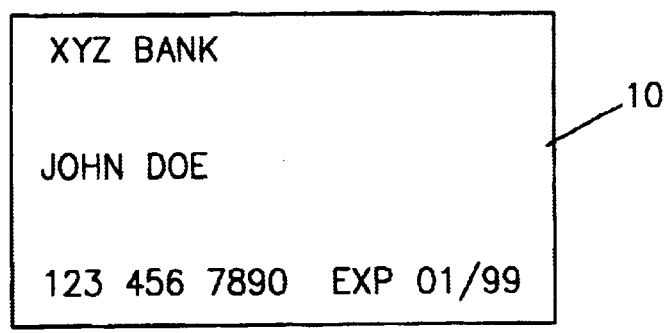
Figure 2A:
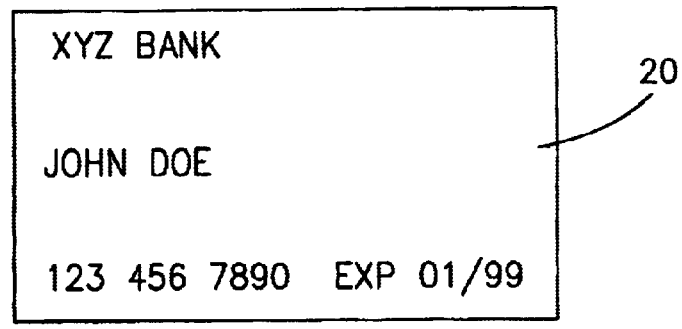
FIGS. 2A and 2B provide illustrations of the front and inside views, respectively, of a prior art smart card with on-board processor.
Figure 2B:
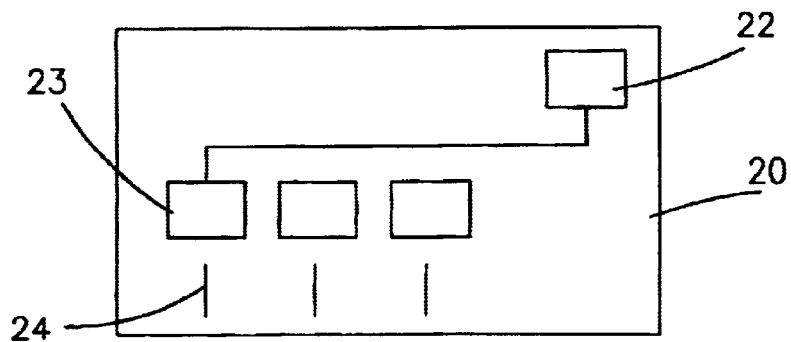
Figure 3A:
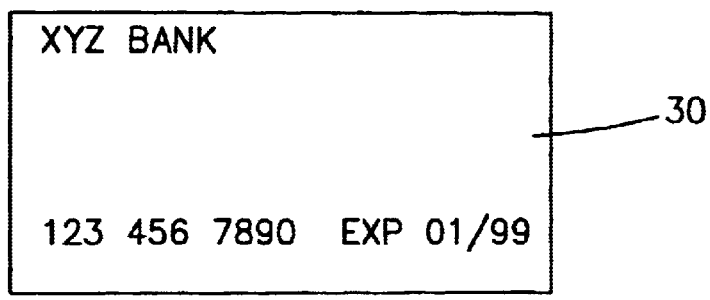
FIGS. 3A and 3B illustrate views of an optical transaction card in accordance with the present invention.
Figure 3B:
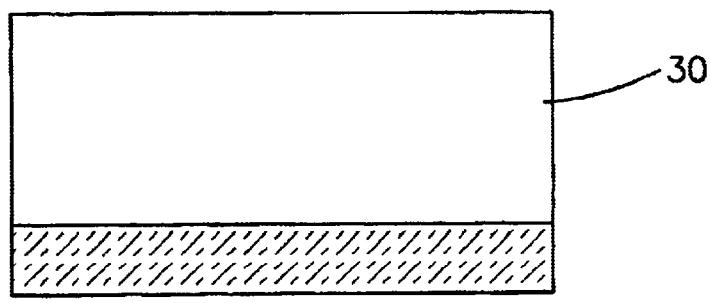

In accordance with the present invention, an optical transaction card, such as depicted as 30 of FIGS. 3A and 3B, is programmed at every available bit location, thereby leaving no room for unauthorized programming. The face of the card, as shown in FIG. 3A, may have the same human-readable information that prior art transaction cards bear, including the name of the financial institution, the name of the party to whom the card has been issued, a unique card number, and an expiration date. For security reasons, less than all of the foregoing information may be included on the card, and may or may not also be incorporated into the machine-readable encoded information provided on the card, as further discussed below. On either the front or the back of the card, as depicted in FIG. 3B, a machine-readable optical stripe will be provided, horizontally (as shown) or vertically (not shown). The optical stripe is preferably located along an edge of the card, for ease of presentation to an optical reader; but, may in fact be incorporated anywhere on either or both faces of the card.

Figure 4:
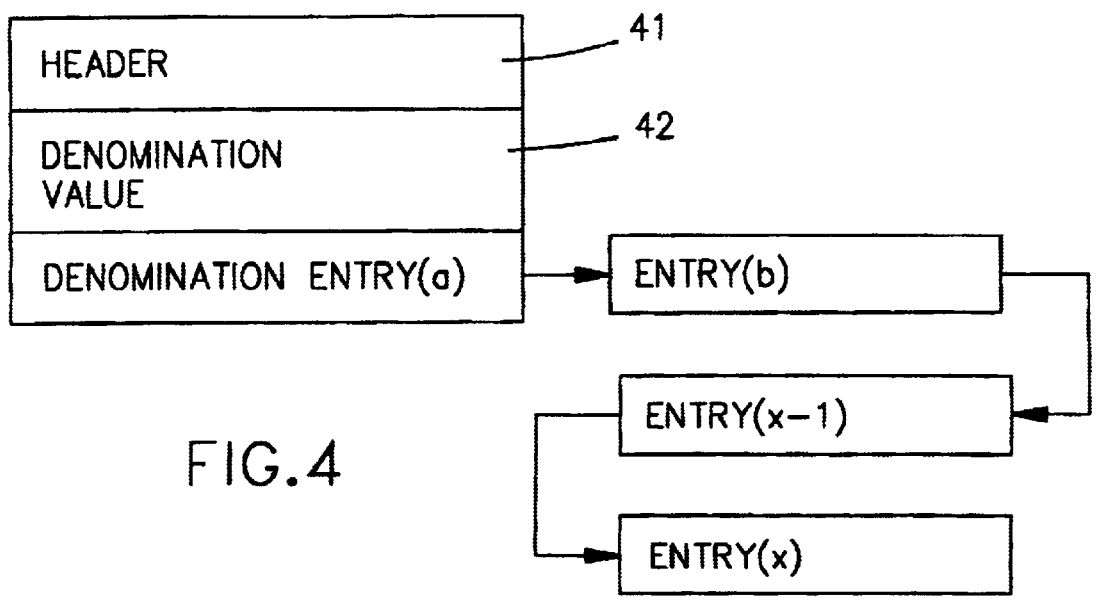
FIG. 4 depicts the information encoded into the optical stripe on an optical transaction card in accordance with the present invention.

The information which is programmed onto the optical stripe 40 of the transaction card, as shown in FIG. 4, includes a header segment, 41, for encoding certain preferred header information as detailed below, and a "body" segment comprising one or more linked lists, one for each denomination value, entry 42, followed by a linked list, 43 comprising entries entry(a) through entry(x), of denomination entries for that value. The one or more linked lists encode the incremental entries cumulatively representing the face value of the card. The card may have a series of denomination value/linked list pairs representing, for example, hundreds, tens, ones, and hundredths (i.e., pennies) in U.S. dollars.

All fields and entries are encrypted and are written on the optical card in two different locations for protection. One or both of the redundant locations will be erased at a merchant location during a transaction. The use of the present invention is the subject of related patent application, Ser. No. 09/213,919, entitled "METHOD FOR USE OF TRANSACTION MEDIA ENCODED WITH WRITE-AND-DESTROY ENTRIES", which was filed on Dec. 17, 1998, and is assigned to the present assignee. The integrity of the optical card depends upon the fact that every entry has been written to, even if the entry does not represent part of the header or an increment of the optical card value. By writing to all locations, the programming equipment leaves no unwritten space for a counterfeiter to use in entering amounts not authorized by the financial institution. Writing all information twice, the familiar redundancy used in many CD-ROM applications, provides integrity from the standpoint of reliability of the programming/writing equipment.

The header segment includes fields for the following: the identity of the issuing agency/financial institution; locale information including the country and currency which the incremental "body" entries represent; the date of recording or programming of the card; a unique sequence or serial number, which may be the same or different from that optional card number printed in human-readable format on the card face; and, the total amount which the programmed bits represent. The unique serial number, or sequence number, can be used for tracing cards and for invalidation of a card by the issuing financial institution in the event that an optical card is reported lost or stolen, as further detailed in the aforementioned co-pending application.

In the "body", the fields include a denomination value entry, 42, followed by a linked list of denomination entries, 43 comprising entry(a) through entry(x). Each denomination entry is accompanied by a link to the next entry. All denomination entries, entry(a) through entry(x-1), encode some increment of the card value, with the exception of the final entry, entry(x). Entry(x), the last entry, is written as NULL to indicate that there are no further links and, assuming that the order of entries is respected when erasing, that the value of the card in that particular denomination has been spent. Multiple linked lists may be provided, as noted above, for different denominations and/or different currencies.

Optical Card Programming

Figure 5:
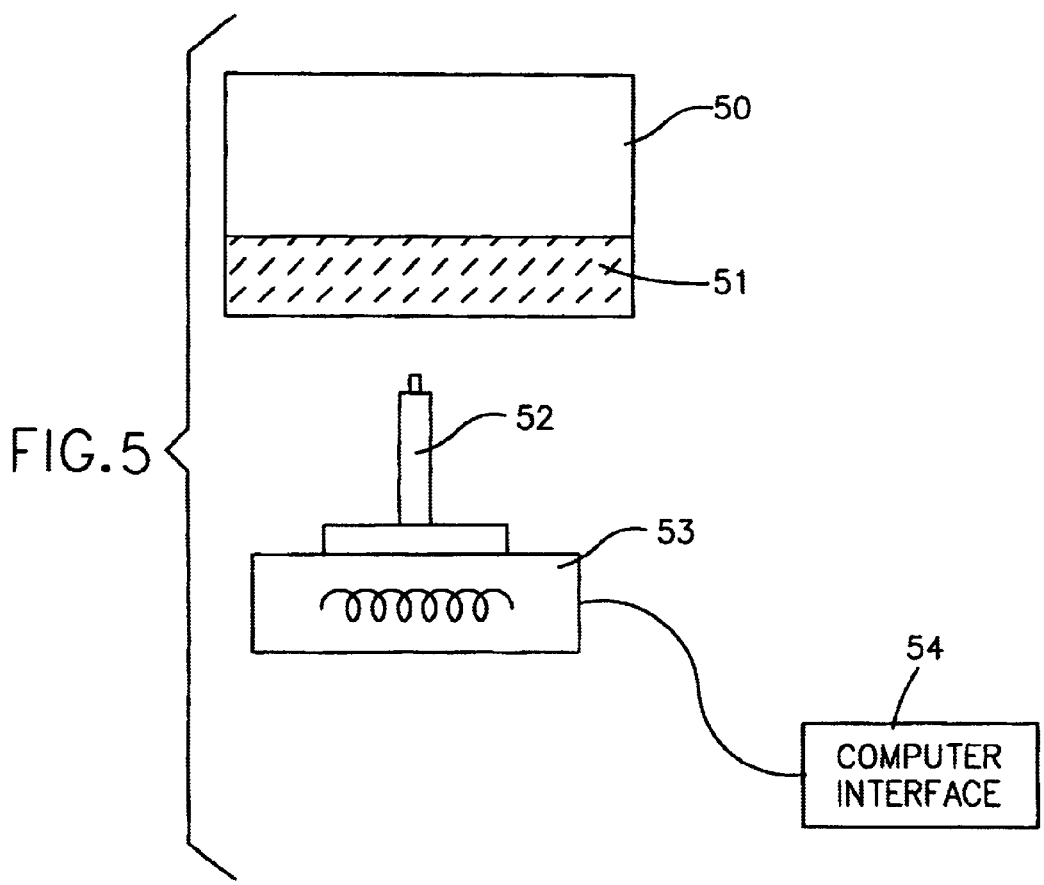
FIG. 5 provides a schematic illustration of an optical card-generating system in accordance with the present invention.

The programming of a transaction card may be conducted at the issuing financial institution or at a remote site (e.g., an ATM) which is temporarily or permanently linked, by modem or other communication means, to the financial institution. FIG. 5 provides a schematic of CD-ROM programming/writing equipment for use in generating the inventive cards. Card 50 bears the optical media, stripe 51, which is written by a laser mechanism 52. The laser writing mechanism is affixed to a stepping motor, 53, which advances the write head to the locations on the optical media as directed by the computer interface. It is to be noted that the equipment could provide the encoding onto a location of the card itself or onto a stripe which would subsequently be attached to a card, the latter providing a lesser degree of security against counterfeiting.

Figure 6:
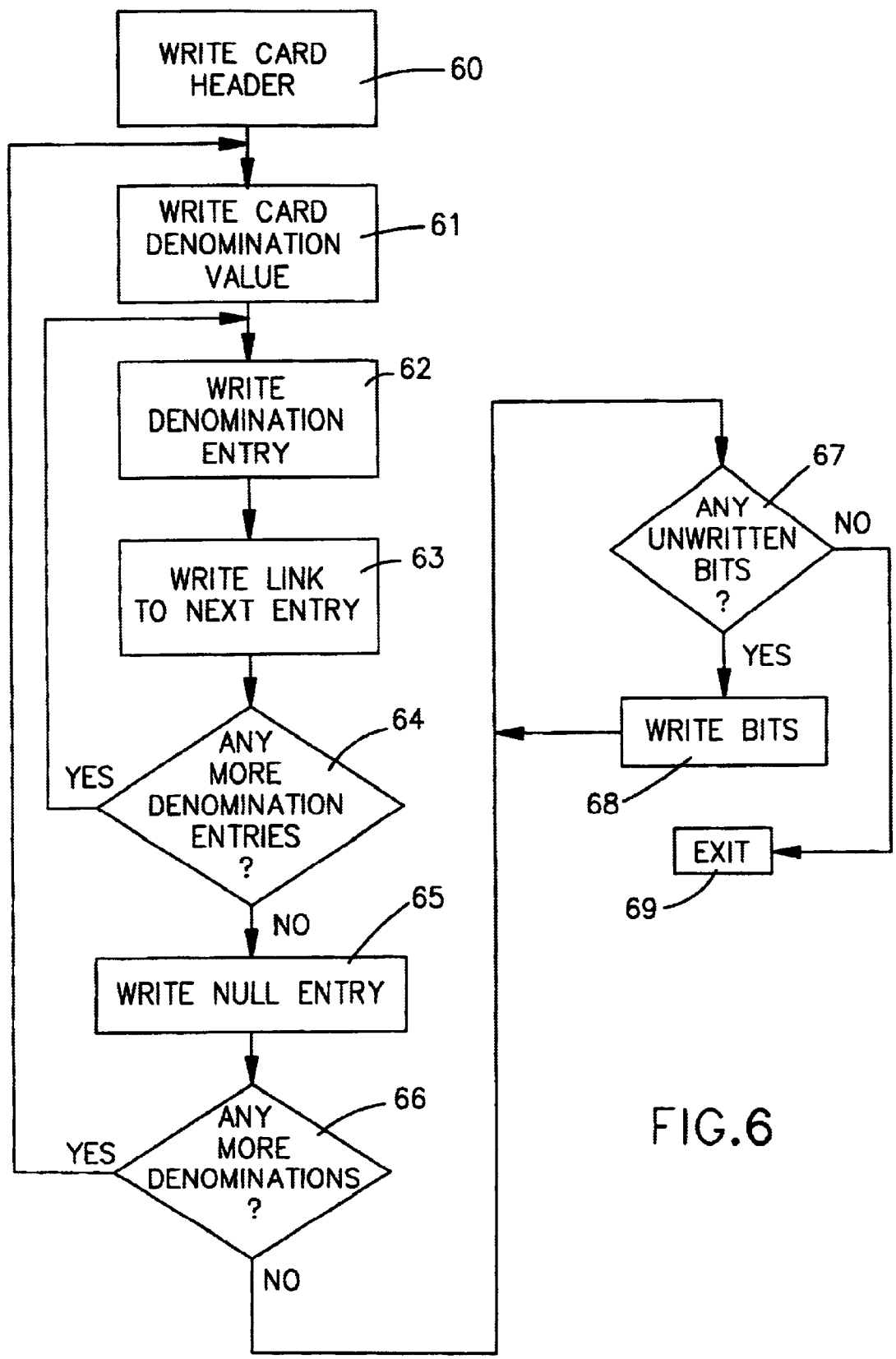
FIG. 6 provides a representative process flow for the programming of the stripe in an optical transaction card.

Upon authorization by the financial institution, which may involve account or balance look-ups, the optical card programming equipment of FIG. 5 begins the FIG. 6 process flow. At step 60, the card header is written, followed by writing of a denomination value, at step 61. Once the denomination value is written, the linked list of denomination entries is created by writing a denomination entry, at step 62, and writing a link to the next entry at 63. Based upon a determination made at decision box 64, as to whether any more denomination entries are needed, steps 62 and 63 are repeated until all of the needed value of that particular denomination has been written to the denomination entries. Once a determination has been made that no further denomination entries are required, a "no" answer at 64, the last entry is written as null, at step 65. After a given denomination has been encoded into the optical stripe, the system checks, at step 66, to see if any other denominations are to be included on the stripe. If another denomination is required, Steps 61 through 65 are repeated for each required denomination which is to be represented by the transaction card (e.g., dollars and cents in U.S. dollars). Once all denominations have been encoded, as determined with a "no" response at step 66, the system checks at step 67 to determine if any unwritten bits remain on the writable area of the stripe. If any unwritten bits remain, they are written at step 68, until all bits are written, a "no" response at decision box 67, at which time the system exits at 69. The system can be programmed to write to two locations for each entry, for the desired redundancy, or can repeat the process flow through step 66, prior to ascertaining step 67 if any unwritten bits remain.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. Apparatus for representing value in user transactions comprising:
   a fixed plurality of first bit locations comprising a plurality of encoded bit locations encoding machine-readable value information, said machine-readable value information comprising more than one denomination value category and at least one value increment comprising a linked list of value increment entries for each said denomination value category, and any remaining unencoded bit locations being unencoded and being marked as used bit locations; and
   a plurality of second bit locations encoding machine-readable identifier information;
   wherein the encoding of said machine-readable identifier information and said machine-readable value information cannot be altered.

2. The apparatus of claim 1 wherein said first and said second bit locations are disposed on a card.

3. The apparatus of claim 2 wherein said card additionally comprises human-readable information disposed thereon.

4. The apparatus of claim 1 wherein said machine readable value amounts and said machine readable identifier information are readable by optical means.

5. The apparatus of claim 1 wherein said first and said second bit locations are encoded using CD-ROM technology.

6. The apparatus of claim 1 further comprising redundant first and second bit locations.

7. The apparatus of claim 1 wherein a last value increment in said linked list is empty thereby indicating the end of said list.

8. The apparatus of claim 1 wherein said machine readable identifier information is taken from the group consisting of financial institution identifier, serial number, total card value, encoding date, and expiration date.

9. A method for providing information for a transaction value to bit locations in a writable medium comprising the steps of:

encoding a plurality of first bit locations with machine readable value information, said encoding comprising writing a denomination value and creating a linked list of denomination entries for said denomination value, and repeating said writing of denomination values and creating linked lists for a plurality of denominations until said transaction value has been encoded;

encoding a plurality of second bit locations with machine-readable identifier information;

determining if any bit locations remain unencoded; and marking as used any remaining unencoded bit locations.

10. A program, storage device readable by machine, tangibly embodying a program of instructions executable by the machine to perform the method steps for providing information for transaction value information to bit locations in a writable medium, said method steps comprising:

encoding a plurality of first bit locations with machine readable value information, said encoding comprising writing a denomination value and creating a linked list of denomination entries for said denomination value, and repeating said writing of denomination values and creating linked lists for a plurality of denominations until said transaction value has been encoded;

encoding a plurality of second bit locations with machine-readable identifier information;

determining if any bit locations remain unencoded; and marking any remaining unencoded bit locations as used.

* * * * *